UNITED STATES PATENT OFFICE.

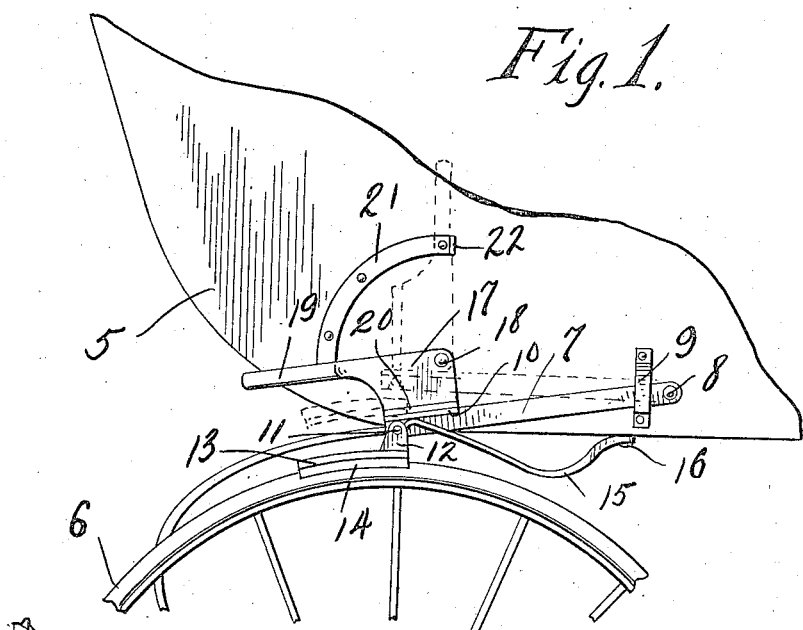
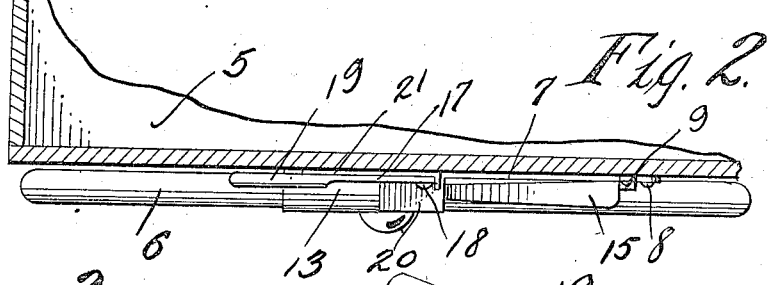
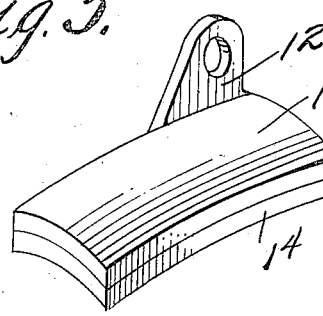
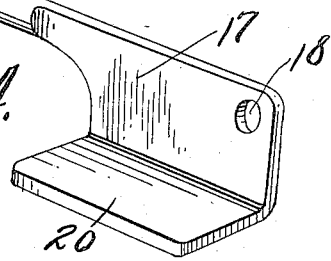

WILLIAM WOOLSEY, JR., OF LYNBROOK, NEW YORK.

BRAKE FOR BABY-CARRIAGES.

1,247,056.

Specification of Letters Patent.  Patented Nov. 20, 1917.

Application filed March 22, 1917.  Serial No. 156,672.

*To all whom it may concern:*

Be it known that I, WILLIAM WOOLSEY, Jr., a citizen of the United States, residing at Lynbrook, in the county of Nassau, State of New York, have invented certain new and useful Improvements in Brakes for Baby-Carriages; and I do hereby declare the following to be a full, clear, and exact description of the invention, such as will enable others skilled in the art to which it appertains to make and use the same.

This invention is an improvement in vehicles and has particular reference to a brake for baby carriages.

An object of the invention is to provide an improved brake which, when in operative position, will effectively prevent movement of the vehicle and, to this end, use is made of a brake shoe pivoted to the vehicle body and engaged by a locking element also carried by said body to cause said shoe to contact an adjacent wheel.

Another object is the provision of a brake of this character which is simple in construction, easy to manufacture, and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is a fragmentary side elevation of a baby carriage showing the brake applied thereto and constructed in accordance with the invention.

Fig. 2 is a top plan view, the vehicle body being shown in section.

Fig. 3 is a perspective view of the brake shoe and supporting means therefor.

Fig. 4 is a similar view of the operating and locking member.

Referring more particularly to the accompanying drawing the numeral 5 indicates a vehicle body of any preferred construction having the usual wheel 6.

The brake which comprises the essential feature of the invention is shown in what is now believed to be its preferred form and comprises a brake shoe supporting arm 7 pivoted at 8 to the vehicle body and movable in a bracket 9 also secured to said body and adapted to limit the swinging movement of said arm. The upper longitudinal edge of the arm 7 at the rear end thereof is provided with a laterally and outwardly extending contact plate 10, the purpose of which will presently appear. Secured at 11 to the free end of the arm 7 and beneath the plate 10 is the lug or ear 12 of the brake shoe 13 provided with a leather contact piece 14 which is adapted to engage the rim of the wheel 6 when the brake is in operative position. In order to normally retain the brake shoe in inoperative position a bowed leaf spring 15 has one end secured to the under side of the vehicle body at 16 and its other end is connected to the free end of the arm 7 and exerting an upward pressure on said arm whereby to disengage the brake shoe from the wheel.

The means for adjusting the brake shoe to operative position and locking the same in this position preferably comprises a locking member 17 pivoted at 18 to the body 5 and having a handle 19 secured thereto. One edge of the member 17 is provided with a laterally extending contact plate 20 adapted to engage the plate 10 of the arm 7 to adjust said arm and brake shoe to braking position. Secured to the vehicle body is an arcuate plate 21 adapted for contact by the member 17 and provided at its upper end with a stop 22 which is engaged by said member 17 to limit the movement thereof to inoperative position.

When it is desired to apply the brake to the wheel 6 the handle 19 is grasped by the operator and the member 17 swung about its pivot thus causing the plates 10 and 20 to come in contact and the free end of the arms 7 and the brake shoe swung downwardly against the tension of the spring 15 until said brake shoe contacts the rim of the wheel 6. Through the peculiar construction and mounting of the member 17 and the friction caused by the contact between the plates 10 and 20 the member 17 will remain in its adjusted or operative position and thus lock the brake shoe in engagement with the wheel until the handle 19 is raised by the operator whereupon the spring 15 will return the parts to normal position.

What is claimed is:—

1. In a brake mechanism for wheeled vehicles, the combination with a body, of a brake shoe supporting member pivoted to said body and having a laterally extending contact plate, a brake shoe secured to said supporting member, and an operating and locking member pivoted to said body and also having a laterally extending contact plate adapted to engage the first named contact plate when said member is operated to adjust the brake shoe into contact with a wheel of the vehicle.

2. In a brake mechanism for wheeled vehicles, the combination with a body, of a brake shoe supporting member pivoted to said body and having a laterally extending contact plate, a brake shoe secured to said supporting member, an operating and locking member pivoted to said body and also having a laterally extending contact plate adapted to engage the first named contact plate when said member is operated to adjust the brake shoe into contact with a wheel of the vehicle, and a guide member secured to said body and having a stop for limiting the movement of said operating and locking member to inoperative position.

3. In a brake mechanism for wheeled vehicles, the combination with a body, of a brake shoe supporting member pivoted to said body and having a laterally extending contact plate, a brake shoe secured to said supporting member, an operating and locking member pivoted to said body and also having a laterally extending contact plate adapted to engage the first named contact plate when said member is operated to adjust the brake shoe into contact with a wheel of the vehicle, a guide member secured to said body and having a stop for limiting the movement of said operating and locking member to inoperative position, and a spring secured to said body and engaging said brake shoe supporting member to disengage the brake shoe from the wheel when said operating and locking member is returned to inoperative position.

4. In a brake mechanism for wheeled vehicles, the combination with a body, of a brake shoe supporting member pivoted to said body and having a laterally extending contact plate, a brake shoe secured to said supporting member, an operating and locking member pivoted to said body and also having a laterally extending contact plate adapted to engage the first named contact plate when said member is operated to adjust the brake shoe into contact with a wheel of the vehicle, a guide member secured to said body and having a stop for limiting the movement of said operating and locking member to inoperative position, and means engaging said brake shoe supporting member for returning said brake shoe and operating member to inoperative positions after the second named contact plate has been disengaged from the contact plate of said supporting member.

In testimony whereof, I affix my signature in the presence of two witnesses.

WILLIAM WOOLSEY, Jr.

Witnesses:
   JOHN MONAHAN,
   OLIVER V. KILES.

Copies of this patent may be obtained for five cents each, by addressing the "Commissioner of Patents, Washington, D. C."